(12) United States Patent
Kwon et al.

(10) Patent No.: US 7,043,691 B1
(45) Date of Patent: May 9, 2006

(54) METHOD AND APPARATUS FOR ASSISTING A USER TO MAKE A CONNECTION BETWEEN A MAIN DEVICE AND A PERIPHERAL DEVICE

(75) Inventors: Il Gun Kwon, Seoul (KR); Ji Yeon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 09/608,434

(22) Filed: Jun. 30, 2000

(30) Foreign Application Priority Data

Dec. 7, 1999 (KR) ................................ 1999/55490

(51) Int. Cl.
*G06F 3/00* (2006.01)
(52) U.S. Cl. ...................... 715/705; 715/708; 715/709; 715/714; 715/717
(58) Field of Classification Search ................ 345/705, 345/706, 708, 709, 714, 715, 717, 718, 731
See application file for complete search history.

(56) References Cited

U.S. PATENT DOCUMENTS

| | | | | |
|---|---|---|---|---|
| 5,680,323 | A | * | 10/1997 | Barnard ...................... 345/720 |
| 5,828,834 | A | * | 10/1998 | Choi .......................... 713/202 |
| 5,903,266 | A | * | 5/1999 | Berstis et al. ............... 345/708 |
| 5,995,933 | A | * | 11/1999 | Fado et al. .................. 704/270 |
| 6,131,111 | A | * | 10/2000 | Yoshino et al. ............. 709/204 |
| 6,263,499 | B1 | * | 7/2001 | Nakamura et al. .......... 717/171 |
| 6,417,869 | B1 | * | 7/2002 | Do ............................. 345/718 |
| 6,459,961 | B1 | * | 10/2002 | Obradovich et al. ........... 701/1 |

FOREIGN PATENT DOCUMENTS

| | | |
|---|---|---|
| DE | 195 24 919 A1 | 1/1997 |
| DE | 692 14 585 T2 | 2/1997 |
| DE | 196 04 647 A1 | 3/1997 |

\* cited by examiner

*Primary Examiner*—Kristine Kincaid
*Assistant Examiner*—Peng Ke
(74) *Attorney, Agent, or Firm*—Birch, Stewart, Kolasch & Birch, LLP

(57) ABSTRACT

A method and apparatus are provided for assisting a user to make a connection between a main device and peripheral device. An illustration visually demonstrating how to connect one or more peripheral devices to the main device is displayed on a display screen. In one embodiment, the illustration shows at least one connecting portion of the main device, the connecting portion of at least one peripheral device, and the connection between the connecting portion of the main device and the connecting portion of the peripheral device. In another embodiment, more than one or all of the connecting portions of the main device are shown. Alternatively, the connecting portions of a plurality of a peripheral devices are shown.

28 Claims, 7 Drawing Sheets

METHOD AND APPARATUS FOR ASSISTING A USER TO MAKE A CONNECTION BETWEEN A MAIN DEVICE AND A PERIPHERAL DEVICE

BACKGROUND OF THE INVENTION

1. Field of the Invention

The present invention relates to a method and apparatus for guiding connections between a main device and external peripheral devices.

2. Background of the Related Art

Connections between a display device and peripheral devices in the related art have mostly been between a TV receiver and a Video Cassette Recorder (VCR). In such cases, the connection between the TV receiver and the VCR is through a RF output terminal on the VCR and a RF input terminal on the TV receiver, or through a composite video and audio L/R using an external input terminal, i.e. a RCA type jack. Although the connection seems simple, to actually connect or reconnect a TV receiver and a VCR, users frequently refer to a manual. Thus, if the manual is lost, a user may experience difficulty in making even a simple connection.

Also, connections to a TV receiver may become more complicated as there are other peripheral devices for connecting to the TV receiver such as a cable box, a Digital Versatile Disk (DVD), a digital terrestrial broadcast receiver, a satellite set top box, and PC. Moreover, due to a recent increase in the functions of a TV, even more peripheral devices may need to be connected. Thus, if the number of peripheral devices keeps increasing, users will experience more difficulty in connecting a TV receiver to peripheral devices and in order to explain such connections, a user's manual will also become more complicated.

As an alternative to making connections by referring to a user's manual, an initial setup menu in the related art of a TV provides a questionnaire regarding what type of peripheral device needs to be connected and displays the necessary circuit to a user based upon the answers to the questionnaire. Thus, a user can connect a peripheral device to the TV receiver according to the circuit shown on the TV screen. However, the questionnaires are often complicated and if a user wishes to see a connection to a peripheral device other than the one selected, the user can only see the circuit after completing the questionnaire for the selected peripheral device. Thus, a user cannot see the overall connection or wiring at a glance. Particularly, when a user merely wishes to understand how a TV receiver and peripheral devices are connected, the method in the related art is complicated and inconvenient to the user.

SUMMARY OF THE INVENTION

In the method and apparatus for assisting a user to make a connection between a main device and peripheral device, an illustration visually demonstrating how to connect a peripheral device or combination of peripheral devices to the main device is displayed on the display screen. More specifically, in one embodiment, the illustration shows at least one connecting portion of the main device, the connecting portion of at least one peripheral device, and the connection between the connecting portion of the main device and the connecting portion of the peripheral device or devices. In an alternative embodiment, more than one or all of the connecting portions of the main device are shown in the illustration. In addition to or instead of the alternative embodiment, the connecting portion of a plurality of a peripheral devices are shown in the illustration.

In another embodiment of the present invention, the illustration shows at least one connecting portion of the main device, and the connections to make to the connecting portion of the main device when connecting a particular peripheral device. Again, more than one or all of the connecting portions of the main device may be illustrated.

With respect to both the first and second embodiments, and the alternatives thereof, a menu screen is preferably displayed. The menu screen provides as menu items, the peripheral devices or combinations of peripheral devices which can be connected to the main device. A user, through an input device, selects one of the menu items, and based on the menu item selected, the illustration is changed to show the connections between the main device and selected peripheral device or devices.

The main device may be any device to which a plurality of peripheral devices can be connected, such as a TV receiver and a personal computer. The peripheral devices are the peripheral devices associated with the main device. In the case of a TV receiver, the peripheral devices include a VCR, a DVD player, an antenna, a cable box, a digital television receiver, etc.

The method and apparatus for assisting the user to make a connection between the main device and a peripheral device according to the present invention provide the advantages of a user-friendly guide for making such connections without having to resort to a user's manual. Thus, the present invention solves the problems and disadvantages discussed above with respect to the related art.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
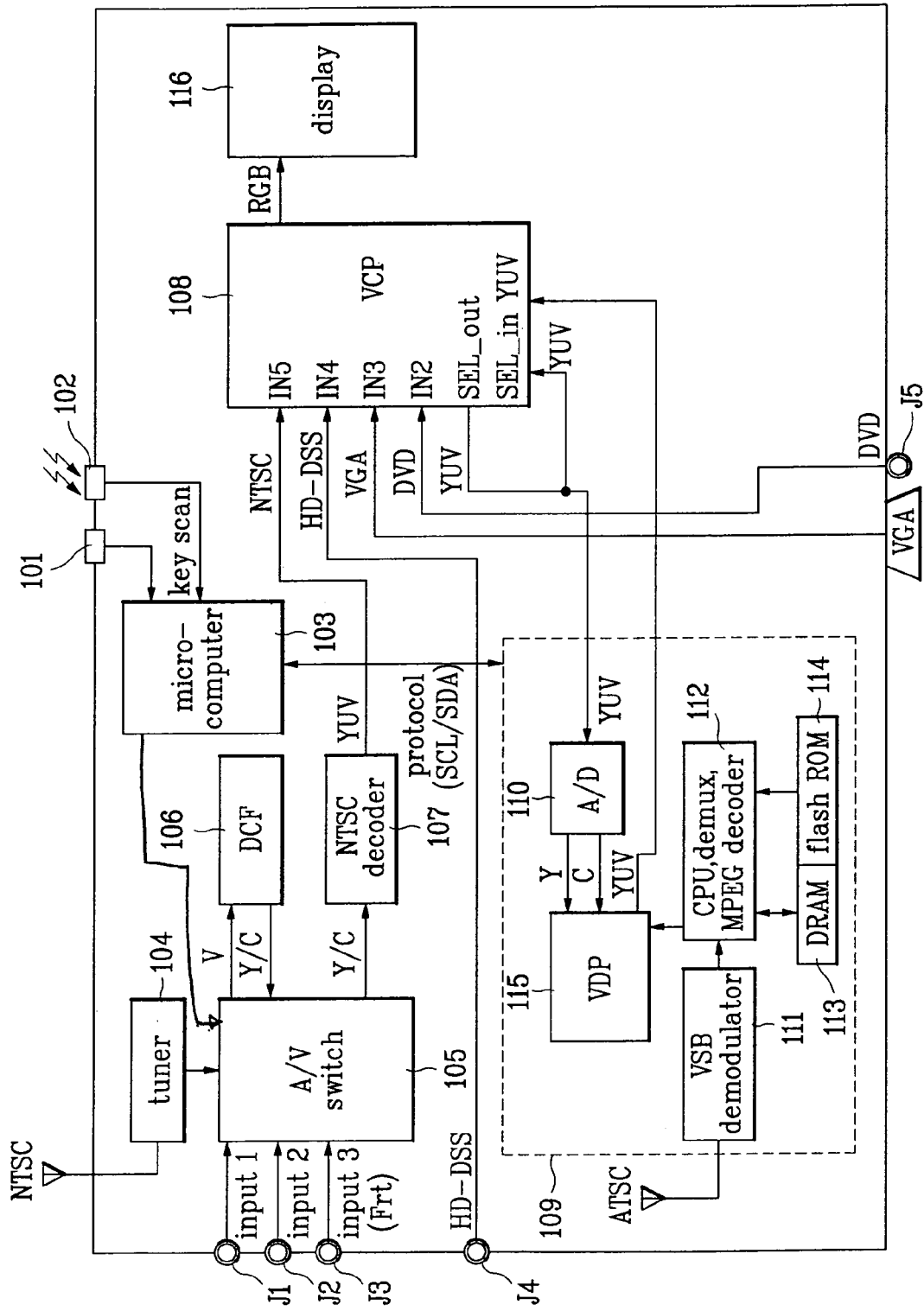
FIG. 1 is a block diagram of a TV receiver in accordance with a preferred embodiment of the present invention.

Reference will now be made in detail to the preferred embodiments of the present invention, examples of which are illustrated in the accompanying drawings. FIG. 1 is a block diagram of a TV receiver in accordance with a preferred embodiment of the present invention.

Referring to FIG. 1, a microcomputer 103 receives a signal from a selection device on a TV receiver through a key receiver 101 or receives signals from an external selection device through an IR receiver 102. Here, the selection device on a TV receiver may be a keypad and the external selection device may be a remote control. An IR/key decoder in the microcomputer 103 interprets codes of the received signals and outputs the interpreted signal to a digital processor 109 through a protocol line.

The digital processor 109 includes a CPU 112 which controls the entire system and executes the built-in programs, according to the signal codes received through the protocol line. As the TV receiver may be connected to a variety of devices, such as a National Television Standards Committee (NTSC) antenna, an Advanced Television Systems Committee (STSC) antenna, a first VCR input terminal J1, a second VCR input terminal J2, a third VCR input terminal J3, a High Definition Distribute Sample Scrambler (HD-DSS) input terminal J4, a DVD input terminal J5, a Video Graphics Array (VGA) input terminal, different selection and operation of peripheral devices is possible if connected.

Thus, keys for selecting the peripheral devices are assigned to a selection device such as the remote control. The assignment may be one key for one peripheral device or one key for a plurality of peripheral devices. If one key is assigned to a plurality of peripheral devices, a peripheral device can be selected by repeatedly pressing a key. Accordingly, if a user presses a key, a corresponding key code value would be sent to the microcomputer 103 through the key receiver 101 or the IR receiver 102. At this time, if a selected peripheral device is connected to the TV receiver through a connection line such as a cable, a signal from the selected peripheral device is sent to the TV receiver through the connection line for processing and display.

For example, if a user selects an antenna by pressing a key, either a signal from the NTSC antenna or the ATSC antenna would be selected. If the user selects an antenna while an analog video signal received through the NTSC antenna is being displayed, a digital video signal received through the ATSC antenna would begin to be displayed on the TV screen. Likewise, if the user selects an antenna while a digital video signal received through the ATSC antenna is being displayed, an analog video signal received through the NTSC antenna would begin to be displayed.

Also, when the user selects a video, one of the composite video signals from the first VCR input terminal J1, the second VCR input terminal J2, or the third VCR input terminal J3 is selected. If video is selected while a video signal received through the first VCR input terminal J1 is being displayed, the video signal received through the second VCR input terminal J2 would begin to be displayed on the TV screen. If the video is selected again, the video signal received through the third VCR input terminal J3 would begin to be displayed on the TV screen. If a user continues selecting the video, the video signals received through the first VCR input terminal J1, the second VCR input terminal J2, and the third VCR input terminal J3 would begin to be displayed on the TV screen, in sequence.

Similarly, if the user selects DVD, a DVD (YCbCr) video signal received through the DVD input terminal J5 would begin to be displayed on the TV screen. If a different peripheral device is selected by a user, a video signal of the corresponding peripheral device would begin to be displayed on the screen. The paths of signals selected by a peripheral device selection will next be discussed.

One of composite video signals received through the first VCR input terminal J1, the second VCR input terminal J2, or the third VCR input terminal J3 is selected through an A/V switch 105. The operation of A/V switch 105 is controlled by user input received from, e.g., source selection key input devices 101 and 102, and processed by the microcomputer 103. The composite video signal selected by the A/V switch 105 is sent to a Digital Comb Filter (DCF) 106 and undergoes a luminance/color (Y/C) separation. Thereafter, the separated Y/C signals are again separated into luminance information and color information U/V through a NTSC decoder 107, and sent to a Video Chroma Processor 108 (VCP). A video signal received by a tuner 104 through the NTSC antenna would also be sent to the VCP 108 in a same process, i.e. through the A/V switch 105, the DCF 106 and the NTSC decoder 107.

The VCP 108 receives the NTSC, HD-DSS, VGA, and DVD signals, selects one of the received signals according to selection by a user, and sends an analog YUV signal to an A/D converting unit 110 in the digital processor 109 through an SEL_out terminal. If there are more peripheral devices that can be connected to the TV receiver, the signals that can be received by the VCP 108 would increase. The A/D converting unit 110 converts the analog YUV signal into a digital YUV signal, and sends the digital YUV signal to a Video Decoding Processor (VDP) 115.

In contrast to the video signals received through the NTSC antenna or input terminals J1~J5, a digital video signal received through the ATSC antenna is sent to a transport demultiplexing and decoding unit in the CPU 112 via a Versatile Sideband (VSB) demodulator 111. The VSB demodulator 111 demodulates the digital video signal, and the CPU 112 demultiplexes the digital video signal to separate out a video bit stream, decodes the separated video bit stream, and outputs the decoded video bit stream to the VDP 115. Here, a DRAM 113 is used during the video decoding, generally for writing and reading a bitstream, reading data required for motion compensation, writing decoded data, and reading data to be displayed. Also, a flash ROM 114 stores a program to be executed by the CPU 112, characters for OSD, and graphic fonts.

Based on user input, the VDP 115 combines a video signal from the A/D converting unit 110 or from the ATSC antenna with an OSD menu generated by a bit map stored in the flash ROM 114, converts the combined signal into a YUV signal, and sends the YUV signal to the VCP 108. The VCP 108 converts the YUV signal into a RGB signal and displays the RGB signal on a display 116 such as the TV receiver screen. Here, the OSD processed image may be displayed in the form of characters or graphics, may be displayed over the video signal used as a background image, or may be displayed alone.

The Easy (EZ) hook up menu screen according to the present invention for showing how to connect a TV receiver to external peripheral devices is displayed on the TV receiver screen as an OSD processed image.

Particularly, the EZ hook up menu screen showing connections between a TV receiver jack panel and an external peripheral device jack panel may be displayed through a sequential selection process on the OSD menu screen.

Alternatively, the EZ hook up menu screen may be displayed directly without an intermediary process by assigning a key on a selection device, with at least one key, as a display of the EZ hook up menu if selected.

In the present invention, the selection device may be a remote control, or a panel selection device attached to a display device. Alternatively, the selection device may be a keyboard or a mouse connected to a display device by cable or radio. In the preferred embodiment, a remote control, which controls a cursor on the screen, is used as the selection device and the cursor may be moved between displayed menus on the screen to selects a desired menu.

Figure 2:
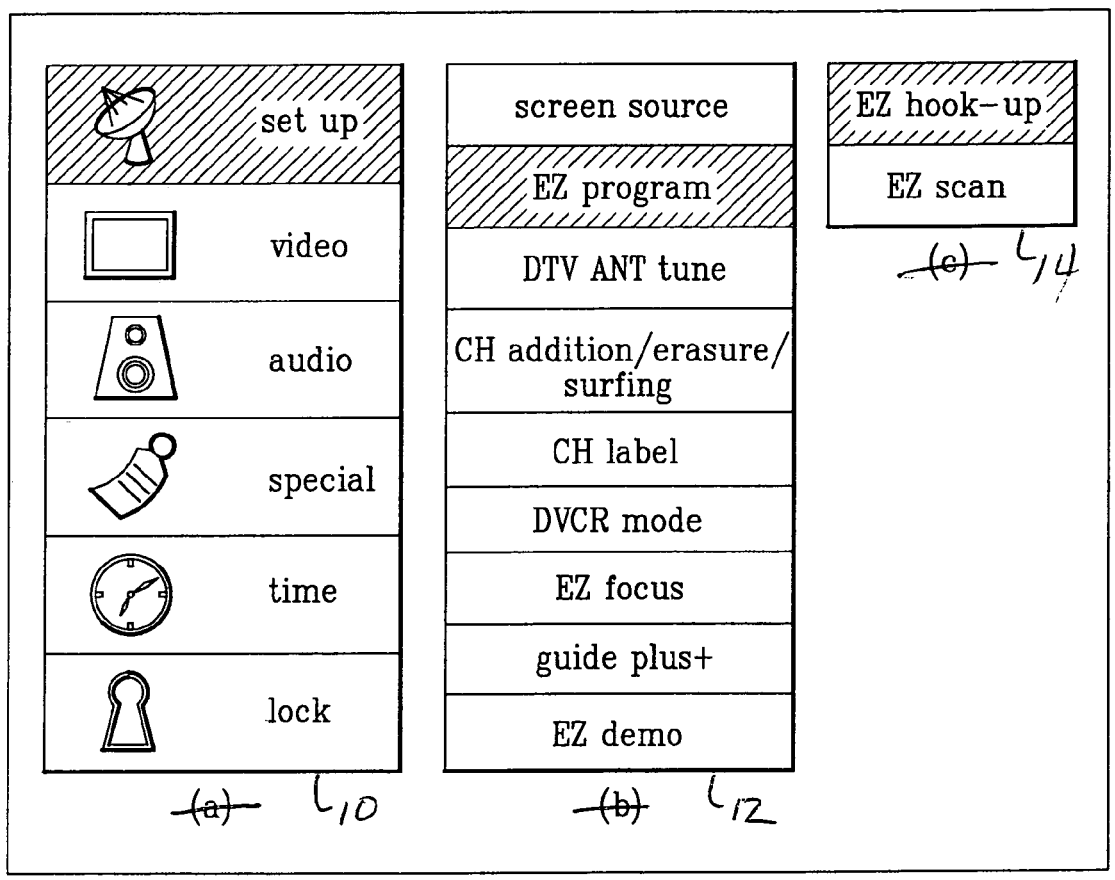
FIG. 2 is a process for selecting an EZ hook up menu in accordance with a preferred embodiment of the present invention.

FIG. 2 shows an example process for selecting an EZ hook up menu through a selection process on an OSD menu screen in accordance with a preferred embodiment of the present invention. Namely, when a user selects to display a menu through a remote control, a main menu 10 is displayed. If the user uses a directional key or a jog shuttle key on the remote control to select an item by moving a cursor up and down the main menu, a submenu 12 of a selected item is displayed.

FIG. 2 shows one example of a submenu 12 displayed when a set up item is selected from the main menu 10. A submenu 12 may be displayed by pressing a selection key when the cursor is positioned at a desired menu item. Alternatively, a submenu 12 may automatically be displayed when a cursor is positioned at a menu item. For example, a submenu corresponding to a highlighted menu item would be displayed even if a selection key is not pressed. Moreover, when a submenu item such as the EZ program is selected in the same manner as a main menu item, a lower level submenu 14 is displayed as shown in FIG. 2. Here, the display position and appearance of the main menu 10, the submenus 12 and 14, and each item may be represented in a different manner according to needs of the display device and preference of the designer.

Figure 3:
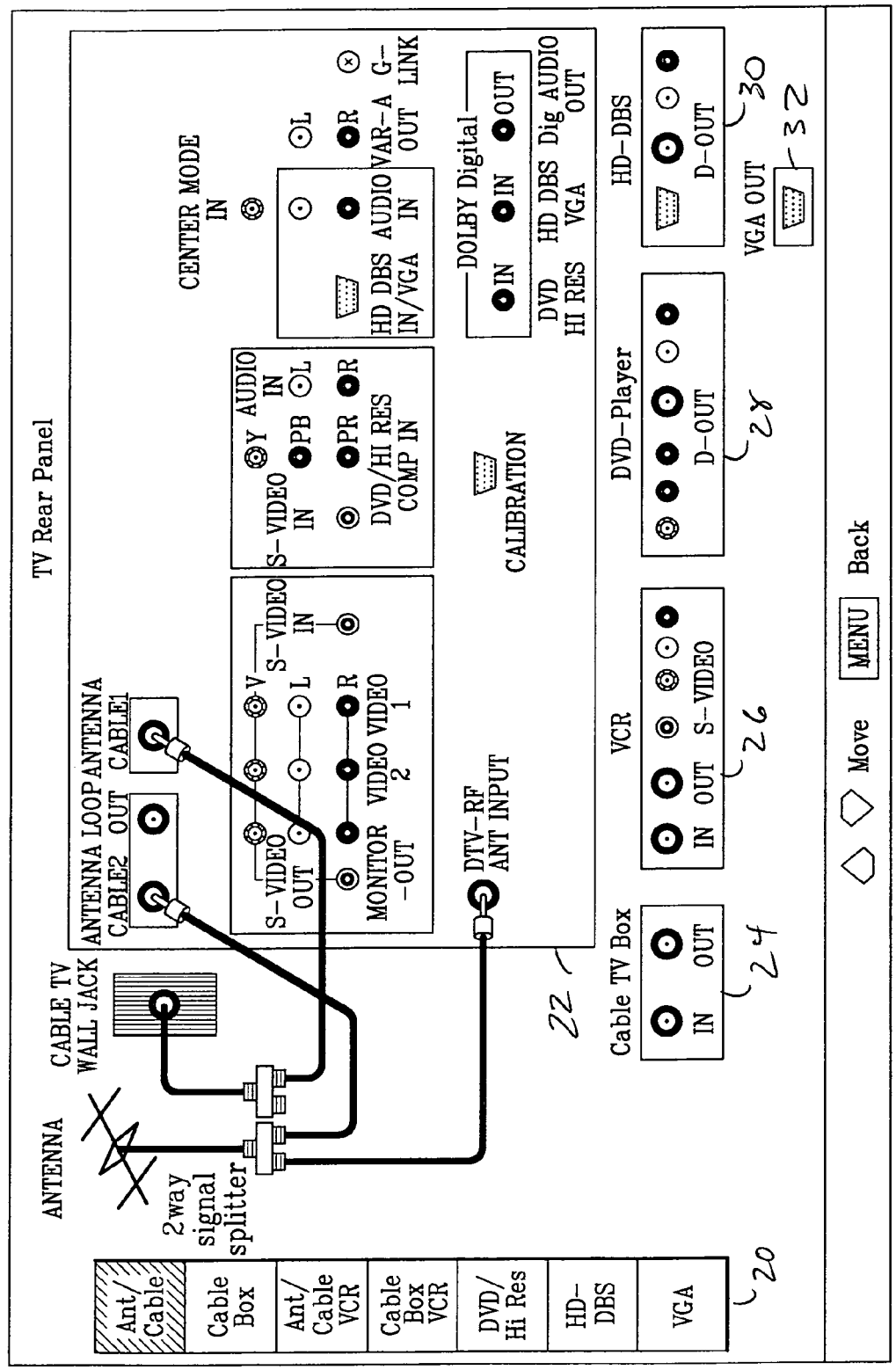
FIG. 3 is a wiring diagram showing connections between a TV receiver and peripheral devices when a cursor is positioned at Ant/Cable item in an EZ hook up menu in accordance with a preferred embodiment of the present invention.

For purposes of the preceding and foregoing explanation, a TV receiver will be assumed as the main device. Accordingly, if the user selects the EZ hook up item from the submenu items shown in FIG. 2, an EZ hook up OSD screen stored in the Flash ROM 114 is displayed in this manner discussed above. FIG. 3 illustrates the this screen display except for the connection between the TV jack panel 22 and the antenna and cable TV wall jack. The EZ hook up OSD screen may also be directly displayed by pressing a pre-assigned key on a remote control.

Referring to FIG. 3, the names of peripheral devices that can be connected to the TV receiver appear as a menu 20 of items which can be selected by moving the cursor. FIG. 3 also shows the TV jack panel 22, and jack panels 24, 26, 28, 30 and 32 of the named peripheral devices. Particularly, the menu items 20 may be an array of icons arranged in the left portion of the screen, where each icon represents one or a combination of peripheral devices.

The icon representations shown in FIG. 3 are one example and may differ in both position and appearance depending upon the needs of the main device and preference of the designer. The combination of peripheral devices represented by the menu items may also change as the peripheral devices that can be connected to main device, e.g. the TV receiver, increases or decreases. Also, icons other than shown in the EZ hook up menu screen of FIG. 3 may be displayed depending upon the needs of the main device and the preference of the designer. For example, an icon which allows movement between the current and previous screen and/or an icon which will display the main menu can be displayed as shown at the bottom of FIG. 3.

Referring back to FIG. 3, antennas, wall jacks, the TV rear jack panel 22 of an actual TV receiver and jack panels 24, 26, 28, 30 and 32 of peripheral device are arranged in a right portion of the screen. Namely, the entire or a portion of the input terminal plate on the rear of the TV receiver may be displayed by the OSD process. The input terminal plate would include different input jacks that can be used to connect to the TV receiver. However, for TV receivers, the input jacks may be located on the side and/or front surface other than the rear surface. In such case, one or all surfaces of the TV receiver may be displayed. For example, the surface including input jacks required for a connection may be displayed as necessary.

Similarly, depending upon the designer, all or less than all terminal plates of peripheral devices that can be connected to the TV receiver may initially be displayed. If less than all terminal plates of peripheral devices are displayed, the plate corresponding to a peripheral device icon selected from the EZ hook up menu items would be displayed together with the connection lines to the TV receiver jack panel. For example, if the cursor is positioned at the VGA icon or the VGA icon is selected from the EZ hook up menu selection items, the VGA terminal plate would be displayed simultaneously with a wiring diagram between the TV receiver and the VGA.

Furthermore, although the EZ hook up menu 20 is displayed in the left portion of the screen with the terminal plates, the menu 20 may be displayed at a different position such as the right portion of the screen. Alternatively, the EZ hook up menu 20 may be displayed initially without the terminal plates. In such case, the terminal plates showing a wiring diagram between the TV receiver and peripheral devices would be displayed on a different OSD screen when an icon or menu item representing one or a combination of peripheral devices is selected.

The operations of the present invention will next be explained with reference to FIGS. 3~6.

For purposes of explanation, the illustrated embodiment of the TV receiver displays the EZ hook up menu 20 in a left portion of the TV screen, where the menu items are combinations of names of peripheral devices that can be connected to the TV receiver. Also, all TV receiver terminal plates and terminal plates of the peripheral devices that can be connected to the TV receiver are displayed in the right portion of the TV screen. Furthermore, a user may move the cursor up and down the EZ hook up menu 20 using a direction key on a remote control to display on the right portion of the screen, a wiring diagram connection between the jack panel 22 of the TV receiver and the jack panel(s) 24, 26, 28, 30 and 32 of peripheral device(s) corresponding to an icon designated by the cursor.

FIG. 3 is a wiring diagram between the TV receiver and the peripheral devices displayed when the cursor is positioned at an Ant/Cable icon or the Ant/Cable item is selected from the EZ hook up menu 20. Namely, when a menu item of the menu 20 is selected, another OSD showing the wiring between the selected peripheral device or devices and the TV receiver is displayed overlaying or superimposed on the OSD of the TV jack panel 22 and the jack panels 24, 26, 28, 30 and 32 of the peripheral devices. Alternatively, the OSD of the TV jack panel 22 and the jack panels 24, 26, 28, 30 and 32 of the peripheral devices could be replaced with a new OSD that shows the TV jack panel 22, the jack panels 24, 26, 28, 30 and 32 of the peripheral devices, and the wiring between the selected peripheral device or devices and the TV receiver.

The wiring diagram of FIG. 3 shows how to connect lines or cables for receiving air signals and cable signals coming through an antenna and the wall jack. Particularly, an input terminal of a 2 way signal splitter is connected to the antenna, one output terminal of the 2 way signal splitter is connected to an ANTENNA CABLE 2 jack, and the other output terminal of the 2 way signal splitter is connected with a DTV-RF ANT INPUT jack. Also, a second input terminal of a 2 way signal splitter is connected to the wall jack and one output terminal of the 2 way signal splitter is connected to an ANTENNA CABLE 1 jack.

Although there can be a variety of ways to connect an antenna and cable TV to a TV receiver, the present invention shows the most recommendable connection of the ANT/Cable connections in the EZ hook up OSD of FIG. 3. Accordingly, an air RF TV signal received through the antenna is input to the ANTENNA CABLE 2 jack and the DTV ANT INPUT jack simultaneously through the 2 way single splitter. Likewise, the cable signal received through the wall jack is provided to the ANTENNA CABLE 1 jack through the 2 way single splitter.

Figure 4:
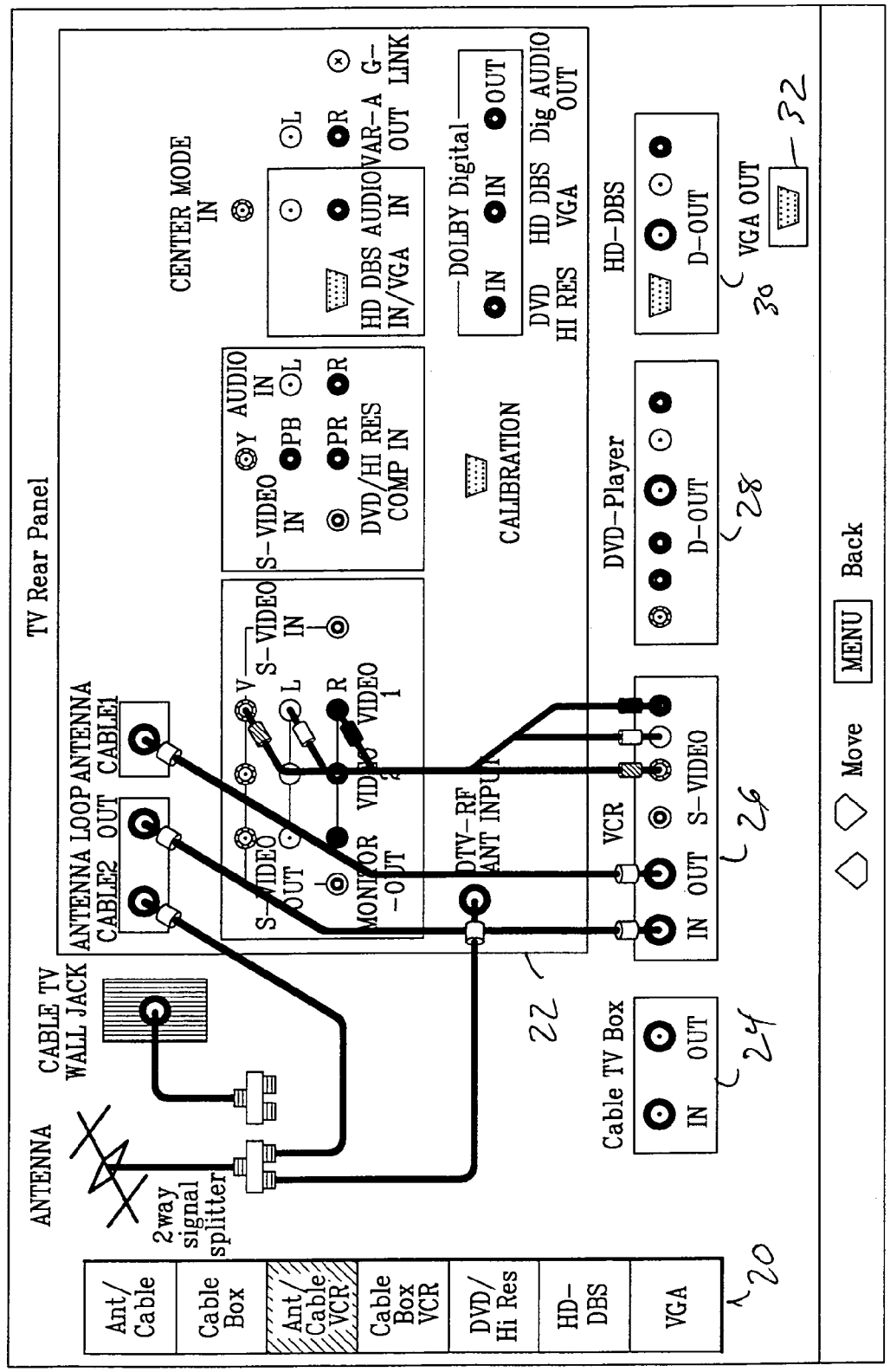
FIG. 4 is a wiring diagram showing connections between a TV receiver and peripheral devices when a cursor is positioned at an Ant/Cable and VCR item in an EZ hook up items in accordance with a preferred embodiment of the present invention.

FIG. 4 is a wiring diagram between the TV receiver and the peripheral devices displayed when the cursor is positioned at or selects Ant/Cable VCR icon from the EZ hook up menu items. In such case, an input terminal of a 2 way signal splitter is connected to the antenna, one output terminal of the 2 way signal splitter is connected to the ANTENNA CABLE 2 jack, and the other output terminal of the 2 way signal splitter is connected to the DTV-RF ANT INPUT jack. A LOOP OUT jack is connected to an IN jack of the VCR and the ANTENNA CABLE 1 jack is connected to an OUT jack of the VCR. Also, VIDEO 1 V, L, R jacks are respectively connected to V, L, R jacks of the VCR.

Accordingly, an air RF TV signal through the antenna is input to the ANTENNA CABLE 2 jack and to the DTV RF ANT INPUT jack through the 2 way single splitter. The RF signal through the ANTENNA CABLE 2 jack is input to the IN jack of the VCR directly through the LOOP OUT jack, the signal from the OUT jack of the VCR is input to the ANTENNA CABLE 1 jack, and a base band composite of the VCR are provided to the VIDEO 1 V, L, R jacks.

Figure 5:
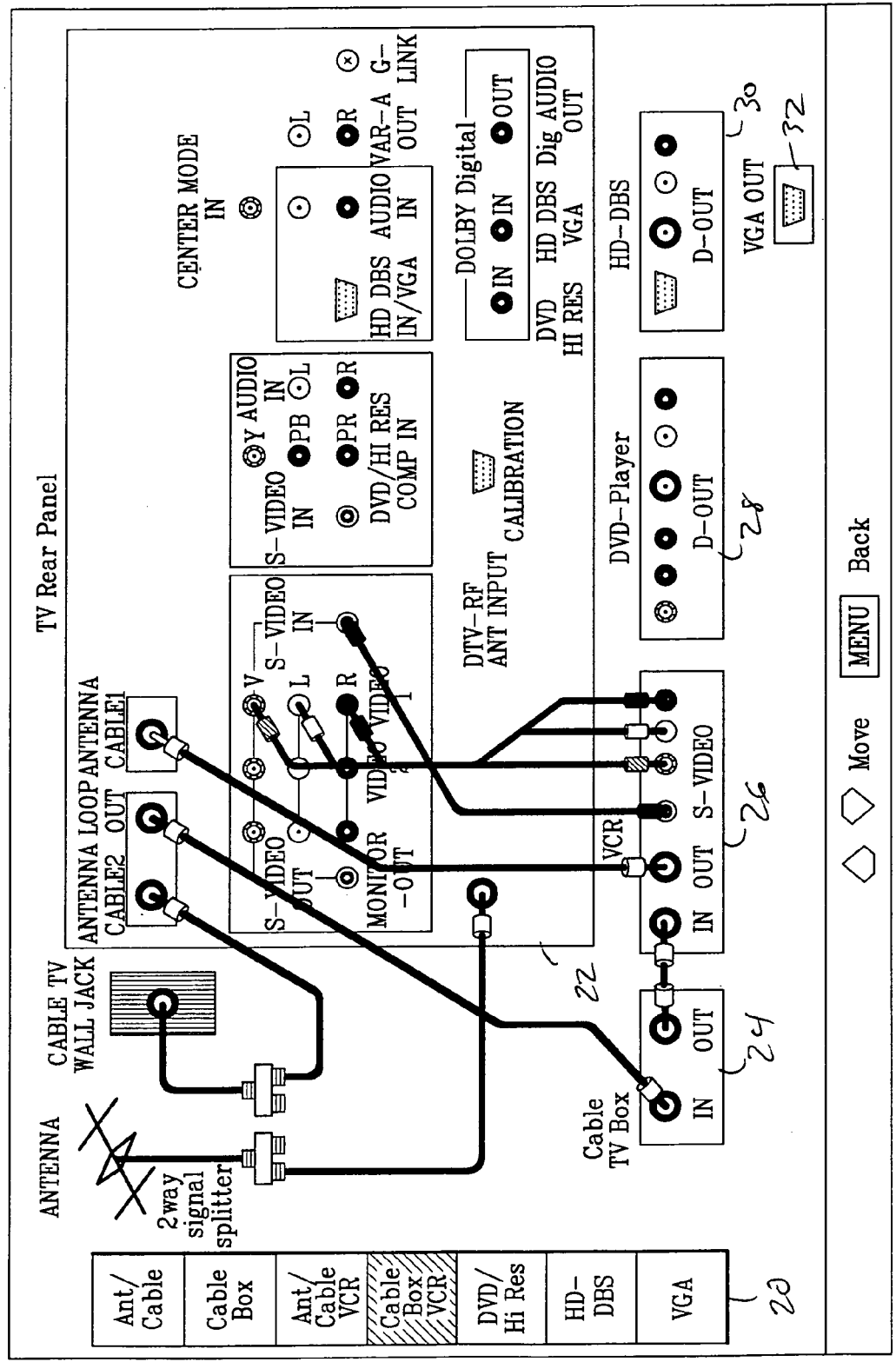
FIG. 5 is a wiring diagram showing connections between a TV receiver and peripheral devices when a cursor is positioned at a Cable Box and VCR item in an EZ hook up menu in accordance with a preferred embodiment of the present invention.

FIG. 5 is a wiring diagram between the TV receiver and the peripheral devices displayed when the cursor is positioned at or selects Cable Box VCR icon from the EZ hook up menu 20. In such a case, an input terminal of a 2 way signal splitter is connected to the antenna and one output terminal of the 2 way signal splitter is connected to the DTV-RF ANT INPUT jack. An input terminal of a second 2 way signal splitter is connected to the wall jack and one output terminal of the 2 way signal splitter is connected to the ANTENNA CABLE 2 jack. A LOOP OUT jack is connected to an IN jack of the Cable TV Box, an OUT jack of the Cable TV Box is connected to an IN jack of the VCR, and an OUT jack on the VCR is connected to the ANTENNA CABLE 1 jack on the TV receiver. Also, the VIDEO 1 V, L, R jacks are respectively connected to the V, L, R jacks on the VCR, and an IN jack on an S-VIDEO is connected to a S-VIDEO jack on the VCR.

Accordingly, a cable signal received through the wall jack is input to the ANTENNA CABLE 2 jack through the 2 way single splitter, and the signal provided to the ANTENNA CABLE 2 jack is provided to an IN jack of the Cable TV Box through the LOOP OUT jack. The signal input to the IN jack of the Cable TV Box is provided to the IN jack on the VCR, and provided to the ANTENNA CABLE 1 jack through the OUT jack on the VCR. The base band composite of the VCR are also provided to the VIDEO 1 V, L and R jacks the same as shown in FIG. 4.

Figure 6:
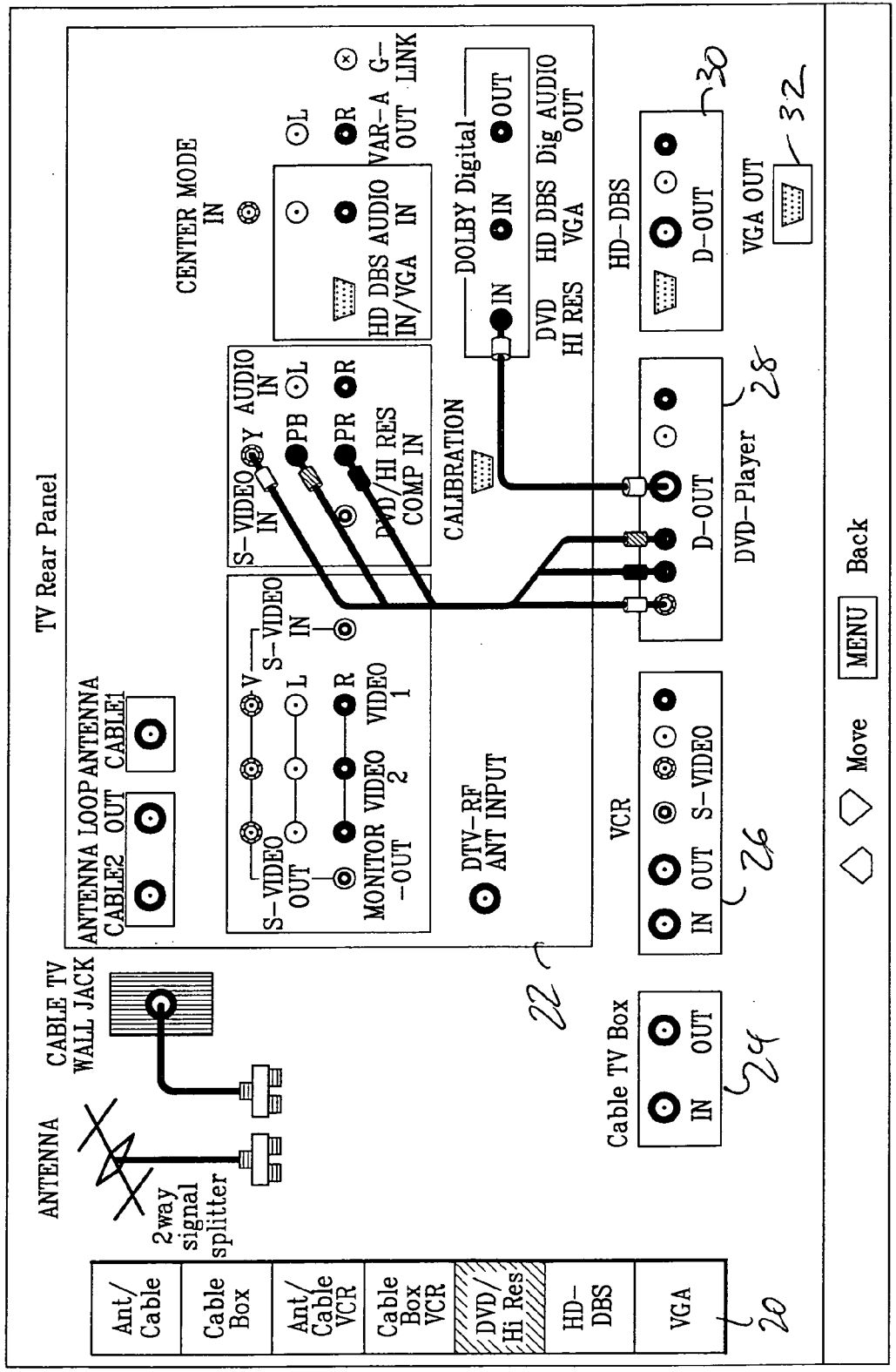
FIG. 6 is a wiring diagram showing connections between a TV receiver and peripheral devices when a cursor is positioned at a DVD/Hi Res item in an EZ hook up menu in accordance with a preferred embodiment of the present invention.

FIG. 6 is a wiring diagram showing connections between a TV receiver and peripheral devices when a cursor is positioned at or selects the DVD/Hi Res icon from EZ hook up menu 20 in accordance with a preferred embodiment of the present invention.

Figure 7:
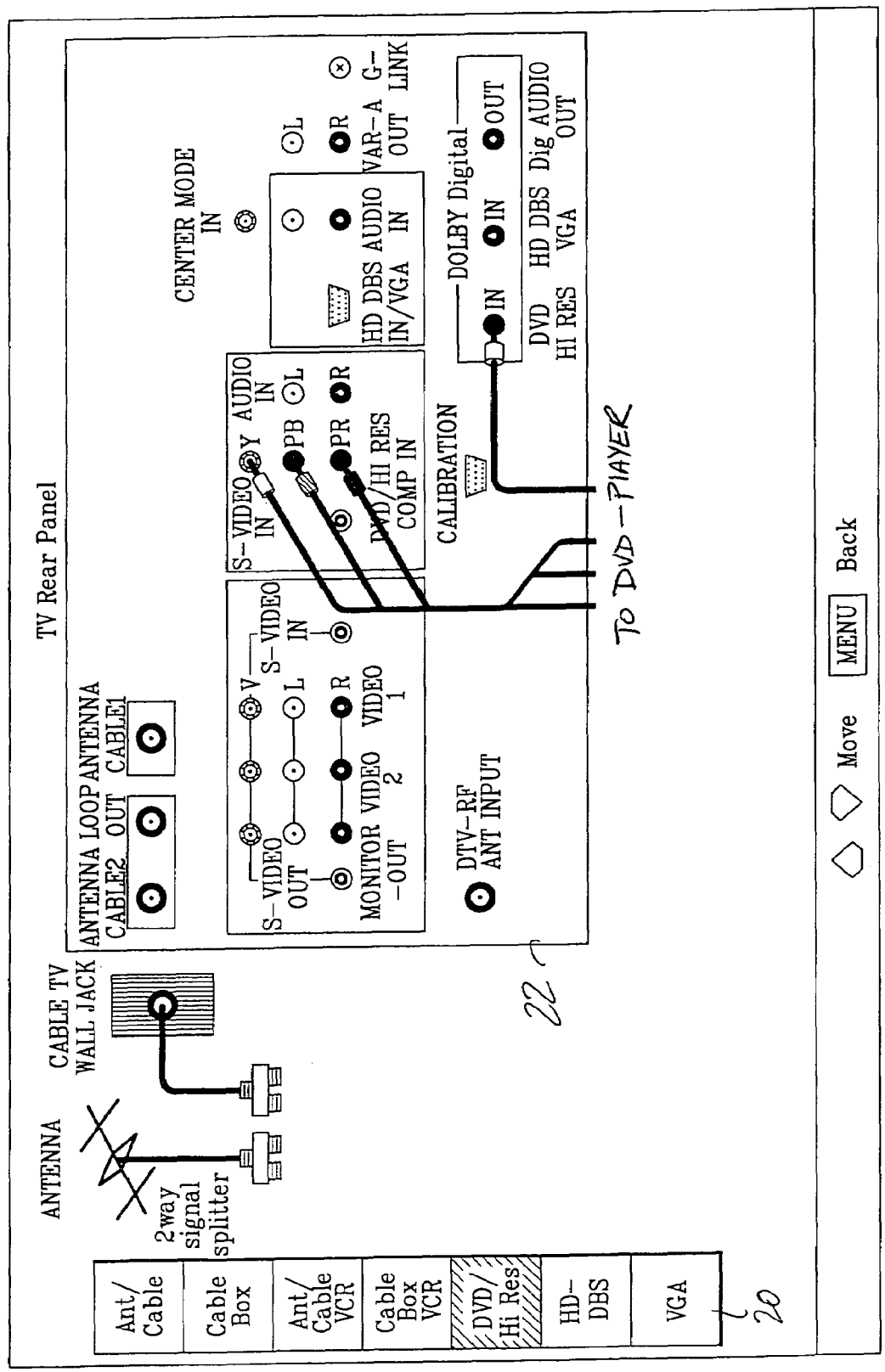
FIG. 7 is a wiring diagram showing connections between a TV receiver and peripheral devices when a cursor is positioned at a DVD/Hi Res item in an EZ hook up menu in accordance with another embodiment of the present invention.

The wiring diagram illustrated by FIGS. 3~6 are examples, and the present invention is not limited to FIGS. 3~6. Instead the wiring diagrams will differ with the TV receiver and the best wiring configuration subjectively considered by the designer. For example, the illustrations on the display screen do not need to show the terminal plates of the peripheral devices. FIG. 7 illustrates a wiring diagram showing how to connect a DVD/Hi Res item to the TV receiver without illustrating the terminal plates of peripheral devices; particularly, the DVD/Hi Res item. Also, the present invention may implement an animation effect in which the lines connecting the main device and peripheral device(s) may move or flash, or the lines or plugs at the ends of lines may be colored for enhanced visual effect.

Also, although the display device in the examples was a TV receiver, the main device may be any device that connects with external peripheral devices. For example, the main device may be an analog TV receiver, a digital TV receiver, a set top box, a PC, etc. For a main device such as a PC, the peripheral devices could include a TV receiver, a disk drive, a mouse, speakers, a printer, etc., and with selection devices such as a mouse, the terminal plates of peripheral devices displayed on the PC screen may each act as an icon such that a wire diagram may be displayed by selecting one or more of the terminal plate icons using the input device. Finally, the present invention can represent in the EZ hook up OSD or graphic, a G-link output from the analog program guide gemstar board, and the remote control sensor fitting method for a VCR and Cable Box.

By displaying an EZ hook up menu having names of the peripheral devices that can be connected to a display device and by displaying a wiring diagram connecting the display device and designated peripheral device(s) in an OSD when a user selects peripheral device(s) through the EZ hook up menu, the present device and method for displaying a connection guide between two devices allows a user to easily understand how to connect between the display device and the peripheral devices. Thus, a connection method between a display device and other peripheral device(s) can quickly be shown when a user selects a peripheral device through the EZ hook up menu. Accordingly, the present invention is a more effective instructional tool for display devices, such as a digital TV receiver, which can be connected to numerous peripheral devices. The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of assisting a user to make a connection between a digital TV and at least two peripheral devices, each peripheral device providing an audio signal and a video signal, comprising:
   displaying a menu on a screen page, the menu including a plurality of menu items, each menu item identifying a different combination of devices to be connected; and displaying, on the same screen page, a guide illustration in response to a user's selection of one of the menu items, the illustration showing how to connect the digital TV to at least one of the at least two peripheral devices indicated by the user-selected menu item.

2. A method of assisting a user to make a connection between a digital TV and at least two peripheral devices, comprising:
displaying on a screen page a menu having a plurality of menu items, each menu item identifying a different combination of devices to be connected; and
displaying a graphical illustration the same screen page in response to a user input selecting on of the menu items, the graphical illustration demonstrating electrical connections between at least two devices among the digital TV and the at least two peripheral devices, whereby the user can make the same electrical connections by viewing the graphical illustration.

3. The method of claim 2, wherein the graphical illustration shows the electrical connections in a highlighted form.

4. The method of claim 3, wherein the highlighted form is a color which differs from a remainder of the graphical illustration.

5. The method of claim 2, wherein in the displaying step, the graphical illustration depicts connection terminals of each of the digital TV and the at least two peripheral devices, and depicts the electrical connections between the connection terminals of the at least two devices depending on the user.

6. The method of claim 2, wherein the displaying step displays the graphical illustration on a display screen of the digital TV.

7. The method of claim 2, wherein each menu item is displayed as an icon.

8. The method of claim 2, further comprising receiving signals from an input device providing instructions on moving a cursor displayed on a display screen onto one of the menu items.

9. The method of claim 2, wherein each of the at least two peripheral devices generates a video signal and an audio signal.

10. A method of assisting a user to make a connection between a main electronic device and at least two peripheral devices, comprising:
displaying a menu on a screen page, the menu including a plurality of menu items, each menu item identifying a different combination of devices to be connected; and
displaying a graphical illustration on the same screen page in response to a user's selection of one of the menu items, the graphical_illustration depicting connection terminals of the main device and connection terminals of each of the at least two peripheral devices, the graphical illustration further depicting connections between the connection terminals of the main device and the peripheral devices indicated by the user-selected menu item, such that the user can make the same connections by viewing the graphical illustration, wherein the main device is a digital TV.

11. The method of claim 10, wherein the at least two peripheral devices include at least two of the following: a broadcast antenna, a cable box, a disk drive, speakers, a mouse, a printer, a DVD player, and a satellite receiver.

12. The method of claim 10, wherein in the step of displaying the graphical illustration, the connections of the connection terminals are wire connections between the connection terminals.

13. The method of claim 1, wherein in the step of displaying, the guide illustration depicts wire connections between terminals of the digital TV and the at least one of the at least two peripheral devices.

14. The method of claim 2, wherein in the step of displaying, the electrical connections are wire connections between terminals of the at least two devices among the digital TV and the at least two peripheral devices.

15. An apparatus for assisting a user to make a connection between a digital TV and at least two peripheral devices, each peripheral device providing an audio signal and a video signal, the apparatus comprising:
a screen display; and
a controller for displaying a menu on a screen page of the screen display, the menu including a plurality of menu items, each menu item identifying a different combination of devices to be connected, the controller also displaying, on the same screen page, a guide illustration in response to a user's selection of one of the menu items, the illustration showing how to connect the digital TV to at least one of the at least two peripheral devices indicated by the user-selected menu item.

16. The apparatus of claim 15, wherein the guide illustration depicts wire connections between terminals of the digital TV and the at least one of the at least two peripheral devices.

17. An apparatus for assisting a user to make a connection between a digital TV and at least two peripheral devices, the apparatus comprising:
a display screen; and
a controller for displaying a menu on a screen page of the display screen, the menu including a plurality of menu items each identifying a different combination of devices to be connected, the controller displaying a graphical illustration on the same screen page in response to a user input selecting one of the menu items, the graphical illustration demonstrating electrical connections between at least two devices among the digital TV and the at least two peripheral devices, whereby the user can make the same electrical connections by viewing the graphical illustration.

18. The apparatus of claim 17, wherein the graphical illustration shows the electrical connections in a highlighted form.

19. The apparatus of claim 18, wherein the highlighted form is a color which differs from a remainder of the graphical illustration.

20. The apparatus of claim 17, wherein the graphical illustration depicts connection terminals of each of the digital TV and the at least two peripheral devices, and depicts the electrical connections between the connection terminals of the at least two devices depending on the user input.

21. The apparatus of claim 17, wherein the display screen is part of the digital TV such that the graphical illustration is displayed on the display screen of the digital TV.

22. The apparatus of claim 17, wherein each menu item is displayed as an icon.

23. The apparatus of claim 17, wherein the controller receives signal from an input device providing instructions on moving a cursor displayed on the display screen onto one of the menu items.

24. The apparatus of claim 17, wherein each of the at least two peripheral devices generates a video signal and an audio signal.

25. The apparatus of claim 17, wherein the electrical connections are wire connections between terminals of the at least two devices among the digital TV and the at least two peripheral devices.

26. An apparatus for assisting a user to make a connection between a main electronic device and at least two peripheral devices, the apparatus comprising:

a display unit;

a controller to display a menu on a screen page of the display unit, the menu including a plurality of menu items, each menu item identifying a different combination of devices to be connected, the controller also displaying a graphical illustration on the same screen page in response to a user's selection of one of the menu items, the graphical illustration depicting connection terminals of the main device and connection terminals of each of the at least two peripheral devices, the graphical illustration further depicting connections between the connection terminals of the main device and the peripheral devices indicated by the user-selected menu item, such that the user can make the same connections by viewing the graphical illustration, wherein the main device is a digital TV.

27. The apparatus of claim 26, wherein the at least two peripheral devices include at least two of the following: a broadcast antenna, a cable box, a disk drive, speakers, a mouse, a printer, a DVD player, and a satellite receiver.

28. The apparatus of claim 26, wherein the connections of the connection terminals are wire connections between the connection terminals.

* * * * *